B. S. BENSON,

Assignor to H. A. SEYMOUR, said SEYMOUR assignor to T. B. HALL.

Plow.

No. 9,549. Reissued Feb. 1, 1881.

WITNESSES

R. Nottingham

A. M. Bright

B. S. Benson INVENTOR

By T. B. Hall

ATTORNEY

THE NORRIS PETERS CO., WASHINGTON, D. C.

UNITED STATES PATENT OFFICE.

BENJAMIN S. BENSON, OF BALTIMORE, MARYLAND, ASSIGNOR TO HENRY A. SEYMOUR, OF WASHINGTON, DISTRICT OF COLUMBIA; SAID SEYMOUR ASSIGNOR TO THOMAS B. HALL, OF WASHINGTON, DISTRICT OF COLUMBIA.

PLOW.

SPECIFICATION forming part of Reissued Letters Patent No. 9,549, dated February 1, 1881.

Original No. 162,015, dated April 13, 1875. Application for reissue filed November 15, 1880.

*To all whom it may concern:*

Be it known that I, BENJAMIN S. BENSON, of Baltimore city, State of Maryland, have invented a new and Improved Plow; and I do hereby declare that the following is a full, clear, and exact description of the same, reference being had to the accompanying drawings, forming a part of this specification.

My invention relates to an improvement in plows, the object being to relieve the plow of undue pressure and friction on its landside and bottom.

Figure 1:
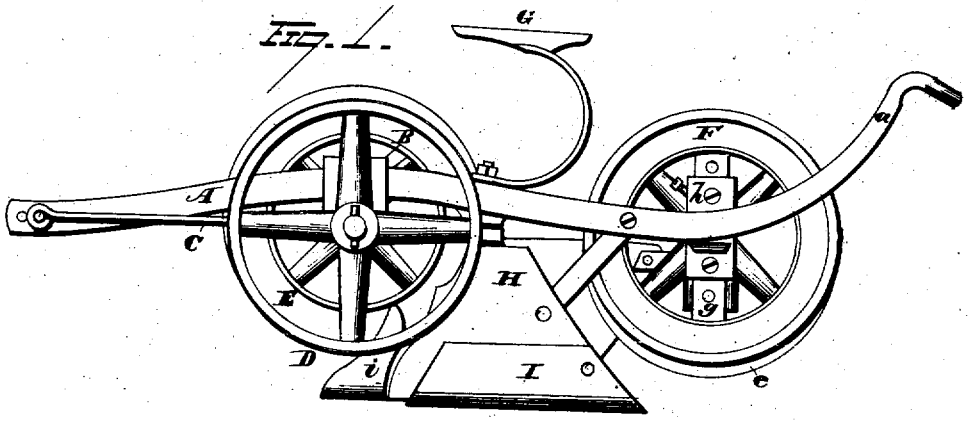
Figure 2:
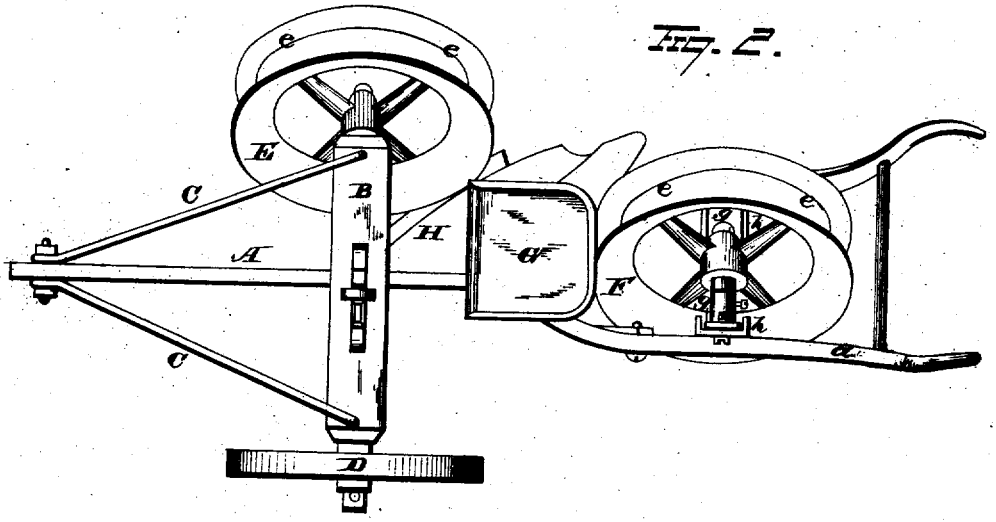
Figure 3:
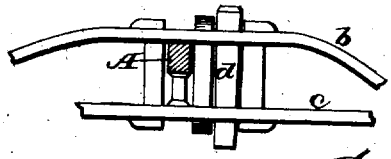

In the accompanying drawings, Figure 1 is a view in side elevation. Fig. 2 is a plan view. Fig. 3 is a detached view of the axle and means employed for the adjustment of the supporting-axle relative to the plow-beam.

In the drawings, A represents the plow-beam, which is extended at *a* to form one of the handles.

B is the plow-supporting axle, and is formed of upper and lower bars, *b*, *c*, between which bars is located the plow-beam A, the axle being adjustably secured to the plow-beam, by means of the gibs and keys *d*, in such a manner that the axle may be adjusted longitudinally and transversely to the plow-beam, for a purpose hereinafter described. The gibs and keys *d* are constructed and applied in such a manner as to allow the plow to be raised and lowered at will.

C are diagonal brace-rods, connected at their rear ends to the outer ends of the supporting-axle, and at their forward ends to the plow-beam, said braces serving to strengthen and impart rigidity to the supporting-axle.

D is an ordinary ground or carrying wheel, attached to one end of the supporting-axle A, said wheel D being constructed and adapted to travel on the unplowed ground and assist in supporting the plow. To the opposite end of the supporting-axle A is attached a wheel, E, which latter is inclined about thirty-five degrees to the vertical plane, so as to allow an angular groove, *e*, upon its periphery to receive and run upon the salient or projecting edge of the unplowed ground.

F is a second inclined wheel, placed in the rear of the plow, which has a similar groove, that runs upon the projecting edge upon the landside of the plow. Said wheel revolves upon a shaft, *f*, which is held by means of binding-screws in the adjustable supports *g*. Said supports are provided with holes, and slide in grooved pieces *h*, also provided with holes, by means of which the plow is raised or lowered for deep or shallow plowing. The plow is also shifted sidewise more or less, toward the land, by shifting loose washers on shaft *f* on either side of the wheel.

G is a seat for the driver, and H is the plow proper, which consists of the ordinary mold-board, provided with a colter and gouge-shaped point, *i*. On the opposite side of the plow is a detachable heel-piece, I, to be used only in running the first furrow.

The operation of the plow is as follows: The first furrow having been plowed, the detachable heel-piece I is taken off. Now, as the plow runs the next furrow, the inclined wheel E, which is attached to the supporting-axle, and is located in front of the mold-board, runs with its angular groove directly upon the salient or projecting edge of the list, or that which constituted the land side for the preceding furrow or list. The wheel E being inclined to the axle serves a twofold function, to wit: It serves to support the plow the same as an ordinary carrying-wheel, and thus relieves the bottom of the plow of undue pressure and friction; and it also serves to prevent the landside of the plow from leading into the unplowed ground, or, in other words, it prevents the landside of the plow from being crowded and pressed against the list or unplowed ground, thereby operating to relieve the landside of undue pressure and friction. The inclined wheel is adjusted toward or away from the plow and secured at any desired distance therefrom, according to the width of the furrow desired. The second inclined wheel, F, which is in the rear of the plow, runs with its angular groove upon the salient or projecting edge of the land side of the ground and takes the place of the heel by relieving the landside of the plow and bottom of the same of the sliding friction, and converts the same into rolling friction, by means of which arrangement the plow is made to run a furrow of uniform depth and width, is made self-guiding, and, by reason of the conversion of the sliding into rolling friction, is made to run with a correspondingly lighter draft.

I am aware that plows have been provided with an inclined wheel located opposite the mold-board, said wheel being adapted to travel on the plowed ground and capable of being turned to guide the plow, and also that an inclined wheel has been employed in rear of the mold-board or plow, said wheel being constructed and arranged to travel against the landside; and hence I make no claim to such construction and combination of parts in a plow.

I am also aware that a short axle has been attached to the forward end of a plow-beam, said axle being provided with an inclined wheel which bears against the vertical wall of the unplowed ground; and hence I make no claim to such construction and arrangement of parts.

Having fully described my invention, what I claim as new, and desire to secure by Letters Patent, is—

1. In a plow supported by carrying-wheels, the combination, with a supporting-axle, of supporting or carrying wheels connected with the opposite ends of said axle and located on opposite sides of the plow, one of said wheels being inclined and adapted to bear against the vertical wall of the unplowed ground, substantially as set forth.

2. In a plow supported by carrying-wheels, the combination, with a supporting-axle, of supporting or carrying wheels connected with the opposite ends of said axle and located on opposite sides of the plow, one of said wheels being inclined and laterally adjustable, and adapted to bear against the vertical wall of the unplowed ground, substantially as set forth.

3. The combination, with a plow, of an inclined wheel provided with a circumferential groove that receives and runs upon the projecting edge of the unplowed ground, substantially as and for the purpose set forth.

4. The combination, with the plow-beam A and the axle B, of the inclined grooved wheel E, for the purpose of regulating the furrow substantially as described.

BENJAMIN S. BENSON.

Witnesses:
W. S. WILKINSON,
J. C. BENSON.